US008408054B2

(12) United States Patent
Hofmeister et al.

(10) Patent No.: US 8,408,054 B2
(45) Date of Patent: Apr. 2, 2013

(54) METHOD AND DEVICE FOR CARRYING OUT AN ADAPTATION AND A DIAGNOSIS OF EMISSION-RELEVANT CONTROL DEVICES IN A VEHICLE

(75) Inventors: Carl-Eike Hofmeister, Regensburg (DE); Michael Käsbauer, Neutraubling (DE)

(73) Assignee: Continental Automotive GmbH, Hannover (DE)

( * ) Notice: Subject to any disclaimer, the term of this patent is extended or adjusted under 35 U.S.C. 154(b) by 389 days.

(21) Appl. No.: 12/741,308

(22) PCT Filed: Oct. 2, 2008

(86) PCT No.: PCT/EP2008/063212
§ 371 (c)(1), (2), (4) Date: May 4, 2010

(87) PCT Pub. No.: WO2009/059854
PCT Pub. Date: May 14, 2009

(65) Prior Publication Data
US 2010/0275680 A1 Nov. 4, 2010

(30) Foreign Application Priority Data
Nov. 9, 2007 (DE) ........................ 10 2007 053 406

(51) Int. Cl.
*G01M 15/04* (2006.01)
(52) U.S. Cl. ................................. 73/114.48; 73/114.49
(58) Field of Classification Search ............... 73/114.49, 73/114.38, 114.45, 114.53, 114.48, 114.52
See application file for complete search history.

(56) References Cited

U.S. PATENT DOCUMENTS

| | | | | |
|---|---|---|---|---|
| 6,438,485 | B1 | 8/2002 | Ries-Müller et al. | 701/102 |
| 6,655,346 | B2 | 12/2003 | Esteghlal et al. | 123/295 |
| 6,701,245 | B2 * | 3/2004 | Birkner et al. | 701/108 |
| 6,739,310 | B2 | 5/2004 | Esteghlal et al. | 123/295 |

(Continued)

FOREIGN PATENT DOCUMENTS

| | | | |
|---|---|---|---|
| DE | 19757875 | A1 | 7/1999 |
| DE | 10043072 | A1 | 3/2002 |

(Continued)

OTHER PUBLICATIONS

German Office Action, German Patent Application No. 10 2007 053 406.1-26, 3 pages, Jul. 14, 2008.

(Continued)

*Primary Examiner* — Eric S McCall
(74) *Attorney, Agent, or Firm* — King & Spalding L.L.P.

(57) ABSTRACT

A method and system for adapting the operation of emission-relevant control devices of a vehicle in a predetermined driving mode having a shorter expected duration that a duration of a preferred test cycle may include several steps. A first step may include determining whether the vehicle has reached the predetermined driving mode. A second step may include diagnosing at least one parameter associated with operation of at least one of the emission-relevant control devices. A third step may include comparing the at least one parameter with a setpoint range or a setpoint value. A fourth step may include carrying out at least a first section of an adaptation for the operation of the at least one emission-relevant control devices. The first section of the adaptation may include optimizing at least one of a plurality of operating points of the at least one emission-relevant control devices.

18 Claims, 1 Drawing Sheet

U.S. PATENT DOCUMENTS

| | | | | |
|---|---|---|---|---|
| 6,842,688 | B2 | 1/2005 | Kasbauer et al. | 701/108 |
| 6,925,864 | B2 | 8/2005 | Beyer et al. | 73/118.1 |
| 7,139,657 | B2 | 11/2006 | Bouchain et al. | 701/104 |
| 7,392,789 | B2 | 7/2008 | Dietl et al. | 123/436 |
| 7,813,868 | B2 | 10/2010 | Zell et al. | 701/112 |
| 2006/0266332 | A1* | 11/2006 | Kloos et al. | 123/446 |
| 2007/0056564 | A1* | 3/2007 | Fujii | 123/480 |
| 2008/0140299 | A1* | 6/2008 | Yamamura et al. | 701/105 |
| 2008/0141975 | A1* | 6/2008 | Fokkelman et al. | 123/350 |
| 2010/0305811 | A1* | 12/2010 | Hofmeister et al. | 701/35 |

FOREIGN PATENT DOCUMENTS

| | | | |
|---|---|---|---|
| DE | 10144337 | A1 | 4/2003 |
| DE | 103 00 592 | A1 | 7/2004 |
| DE | 10257686 | A1 | 7/2004 |
| DE | 103 38 775 | A1 | 3/2005 |
| DE | 10 2004 006 554 | B3 | 6/2005 |
| DE | 10 2004 055 313 | A1 | 5/2006 |
| DE | 102006016818 | A1 | 10/2007 |
| EP | 1 344 920 | A2 | 9/2003 |
| WF | 2007/065852 | A1 | 6/2007 |
| WO | 02/20969 | A1 | 3/2002 |
| WO | 2004/053316 | A1 | 6/2004 |

OTHER PUBLICATIONS

International PCT Search Report, PCT/EP2008/063212, 6 pages, Mailed Mar. 13, 2009.

* cited by examiner

METHOD AND DEVICE FOR CARRYING OUT AN ADAPTATION AND A DIAGNOSIS OF EMISSION-RELEVANT CONTROL DEVICES IN A VEHICLE

CROSS-REFERENCE TO RELATED APPLICATIONS

This application is a U.S. National Stage Application of International Application No. PCT/EP2008/063212 filed Oct. 2, 2008, which designates the United States of America, and claims priority to German Application No. 10 2007 053 406.1 filed Nov. 9, 2007, the contents of which are hereby incorporated by reference in their entirety.

TECHNICAL FIELD

The invention relates to a method and a device for carrying out both an adaptation and a diagnosis of emission-relevant control devices in a vehicle, such as the injection of fuel into the respective cylinder for example.

BACKGROUND

For legal reasons diverse methods for detecting errors are carried out on emission-relevant control devices in automobiles. For different strategies the law demands a specific frequency of execution per driving cycle. In such cases the new driving cycle begins when the engine is started up again (after previously switching off the ignition key) and ends with the beginning of the subsequent driving cycle. The driving cycle consists in such cases as a rule of different driving modes of which some can be more or less suitable for diagnosis and adaptation purposes. The overrun cut-off is relevant for specific diagnosis and adaptation. The longer a driving cycle lasts, the longer the required driving mode is usually also available.

In many cases a similar method is employed both for the diagnosis and also for adaptation of the system. In such cases however the error detection and the adaptation cannot be activated or carried at the same time, but one after the other. This means that either the system is adapted more slowly or a diagnosis does not take place sufficiently often. In other words in the prior art a method is used in which the diagnosis and the adaptation are carried out contiguously in turn for all emission-relevant control devices. The fact that the diagnosis and the adaptation of form a contiguous method however which lasts for the appropriate length of time until all method steps have been run means that for a rather short driving mode which is observed in a driving cycle under some circumstances only an adaptation can typically be carried out but no subsequent diagnosis. Thus under some circumstances the diagnosis cannot be carried out sufficiently frequently in the driving cycle for the driving modes observed therein, as is defined for example by statutory requirements. In the past diagnosis methods were fast enough to fulfill the frequencies of execution of a diagnosis. Such an adaptation could be used directly as diagnosis. Only in more recent, especially slow, adaptations is a separation of adaptation necessary in order to guarantee the necessary frequency of execution for the diagnosis.

No strategy which must be exclusively activated for an adaptation and diagnosis is known thus far from the prior art.

Furthermore a fuel injection quality monitoring is known from the ISOR (initial statement of reasons) of the CARB (California Air Resource Board) which is based on an engine speed evaluation in the overrun cut-off phase for the injection of defined minimum quantities. The execution of a type of diagnosis and adaptation is merely described in general terms here.

A method is also known from DE 102 57 686 A1 for adapting an injection characteristic. In this case an injection valve characteristic reflecting a reference injection behavior of an activated fuel injection valve is adapted to ageing-related changes of an actual injection behavior. In this case the injection valve is activated intermittently during an operating state in which no fuel injection is required. In this case at least one operating cycle proceeds with activation of an operating cycle without activation of the injection valve. In this case a respective speed value of the internal combustion engine is detected for the operating cycle with activation and at least one for the operating cycles without activation. A correction of the injection characteristic is then undertaken based on the difference between the detected values.

SUMMARY

According to various embodiments, a method and a device can be provided in which carrying out at least one part of the adaptation and of the diagnosis can be guaranteed in a respective predetermined driving mode of a driving cycle.

According to and embodiment, a method for carrying out at least a part of an adaptation and a diagnosis for emission-relevant control devices of a vehicle, may comprise the steps of a) Determining whether the vehicle has reached a predetermined driving mode, b) Carrying out a diagnosis for at least one of the emission-relevant control devices, if it is established that the vehicle has reached the predetermined driving mode, with the diagnosis of at least one parameter of an operating point of at least one emission-relevant control device being determined and optimized if this deviates from a setpoint range or from a setpoint value, and c) Carrying out at least one adaptation section of the adaptation for at least one emission-relevant control device, with at least one parameter of a number of operating points of the emission-relevant control devices being determined and optimized in the adaptation if this deviates from a setpoint range or from a setpoint value.

According to a further embodiment, the subdivision of the adaptation into adaptation sections can be selected as a function of a predetermined test cycle, with at least one adaptation section and a diagnosis for at least one emission-relevant control device able to be executed within the predetermined test cycle. According to a further embodiment, when the diagnosis is executed for all emission-relevant control devices, while the adaptation of the emission-relevant control devices is not yet completed, the diagnosis may either be ended or may be continued until the adaptation is completely executed. According to a further embodiment, the predetermined driving mode may be typically an overrun cut-off phase. According to a further embodiment, the emission-relevant control devices can be the cylinders of a vehicle engine. According to a further embodiment, in the diagnosis or the adaptation, an injection time of fuel into a cylinder can be typically optimized as the parameter. According to a further embodiment, in an adaptation section at least one of the following can be executed: all adaptation steps for an emission-relevant control device and a part of the adaptation steps for a number of the emission-relevant control devices. According to a further embodiment, in the diagnosis it can be determined whether the parameter lies in a setpoint range, with the parameter being matched in an adaptation cycle if this lies outside the setpoint range, with the parameter preferably being approximated to a predetermined setpoint value in a setpoint range. According to a further embodiment, it can be determined in the adaptation whether a parameter lies in a setpoint range, with the parameter largely being approximated to a predetermined setpoint value in one or more adaptation cycles. According to a further embodiment, an error value can be stored if the parameter lies outside the setpoint range after ending of the diagnosis and/or the adaptation, with the error value typically being a scalar variable which is set in correlation to the deviation from the setpoint value and/or contains an error code which specifies that the emission-relevant control device is faulty. According to a further embodiment, the error values of the emission-relevant control devices can be summed into an overall error value and with an error message being output to the driver, if the overall error value exceeds a threshold value, with the threshold value typically being an emission limit value.

According to another embodiment, a device for carrying out at least one part of an adaptation and a diagnosis for emission-relevant control devices of a vehicle, may comprise: a) A driving mode determination device that determines whether the vehicle has reached a predetermined driving mode, b) A diagnosis device for executing a diagnosis for at least one of the emission-relevant control devices, if the driving mode determination device establishes that the vehicle has reached the predetermined driving mode, with the diagnosis device determining and optimizing at least one parameter of an operating point of at least one emission-relevant control device, and c) An adaptation device which is embodied such that it executes at least one adaptation section for at least one emission-relevant control device if the driving mode determination device establishes that the vehicle has reached the predetermined driving mode, with at least one parameter of a number of operating points of the emission-relevant control devices being determined and optimized in the adaptation.

According to a further embodiment of the device, an error storage device can be provided which stores a scalar variable as an error value if the parameter lies outside the setpoint range after ending of the diagnosis and/or the adaptation, with the error value being set in correlation to the deviation from the setpoint value and/or stores an error code which specifies that the emission-relevant control device is faulty if the parameter lies outside the setpoint range after ending of the diagnosis and/or the adaptation.

BRIEF DESCRIPTION OF THE DRAWINGS

The invention will now be explained in greater detail on the basis of various embodiments in the enclosed drawings. The figures show.

DETAILED DESCRIPTION

Figure 1:
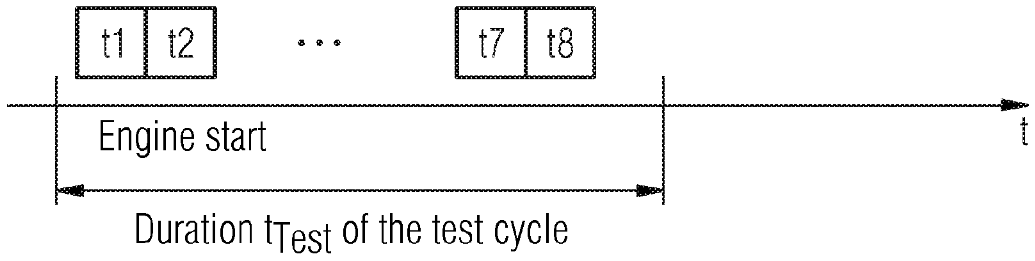
FIG. 1 a diagram in which a diagnosis of cylinders of a motor vehicle is carried out in a driving mode at the beginning of the driving mode, FIG. 2 a diagram in which a diagnosis and an adaptation of cylinders of a vehicle is carried out in a driving mode in accordance with an embodiment, and FIG. 3 a diagram in which a diagnosis of cylinders of an engine is carried out during different or a number of driving modes in accordance with an embodiment.

According to various embodiments, a method and a device for carrying out at least one part of an adaptation and a diagnosis for emission-relevant control devices of a vehicle can be provided. A diagnosis is carried out here for at least one of the emission-relevant control devices when it is established that a vehicle has reached a specific predetermined driving mode, for example an overrun cut-off phase or another driving mode suitable for a diagnosis and adaptation. During diagnosis in such cases at least one parameter of an operating point of a least one emission-relevant control device is determined and optimized if said parameter deviates from a setpoint range or setpoint value. Furthermore a least one adaptation section or a part of the adaptation is carried out for a least one of the emission-relevant control devices, with at least one parameter of a number of operating points of the emission-relevant control devices being determined and optimized in the adaptation if this parameter deviates from a setpoint range or setpoint value.

This has the advantage that, in a normal predetermined driving mode of the driving cycle, a part of the diagnosis and the adaptation can be undertaken for an emission-relevant control device. In the state of the art the adaptation and the diagnosis are combined and are executed as one unit in a driving mode of a driving cycle. According to various embodiments, on the other hand the diagnosis and the adaptation are split up.

In this case the part which can be executed quickly and allows a first rough adaptation, here the optimization of a least one parameter of an operating point of an emission-relevant control device is typically combined in the diagnosis. On the other hand the part is executed in the adaptation in which the fine matching is undertaken, here the matching or adaptation of a least one parameter of a number of operating points of the emission-relevant control devices. Since the adaptation requires a longer time for the execution for the respective emission-relevant control devices, it is divided up into sections, with a least one section being executed in the predetermined driving mode of the driving cycle. In this way it can be ensured that at least one part of the diagnosis and adaptation can be executed in a respective predetermined driving mode of a driving cycle, by contrast with the prior art.

In a further embodiment the adaptation is subdivided into adaptation steps depending on a predetermined driving mode. The length of the driving mode can in this case be specified by statutory requirements or by assumptions of how long the average predetermined driving mode, such as an overrun cut-off phase, lasts for example In a driving cycle in this case one or more differing driving modes can be observed. The division of the adaptation into individual sections in which parts of the adaptation are executed on the basis of such a driving mode has the advantage that the adaptation does not have to be completely executed in a first driving mode, but can be sensibly very simply be divided up into a number of such driving modes, for example a number of overrun cut-off phases or other driving modes. The fact that the adaptation is divided up on the basis of the length of a prescribed test cycle for example or on the basis of an average driving mode enables it to be ensured that for this predetermined test cycle or for the average driving mode the complete diagnosis is executed (legally) required. It is also ensured that a part of the adaptation always takes place and not just either a diagnosis or an adaptation as in cases in the prior art. In normal operation (without taking into account a test cycle) it is ensured that always at least one part of the adaptation and a maximum possible proportion of the diagnosis will be carried out. This ensures that the system is always able to be adapted and the diagnosis execution rate is as high as possible.

In accordance with a further embodiment, the adaptation is divided up such that at least one adaptation step and a diagnosis can be executed for at least one emission-relevant control device within a predetermined driving mode. This enables it to be ensured that for driving modes which are not shorter than the typical legally-required test cycle, the complete diagnosis and the adaptation can be executed at least in part.

In a further embodiment, if the diagnosis is already executed for all emission-relevant control devices and the adaptation is not yet completed, the diagnosis is continued until the adaptation is completely executed. This has the advantage that the results of the diagnosis can be updated until the adaptation is completed.

In another embodiment the predetermined driving mode is typically an overrun cut-off phase. The overrun cut-off phase has the advantage that in this phase the driver lifts off the gas and no longer actuates the gas pedal so that injections of very smallest amounts of fuel take place uninfluenced by the driver. These can be assigned relatively precisely to the cylinders and thus a more precise matching of a parameter such as the fuel injection amount occurs.

In accordance with an embodiment the opening times of the injection valve are typically optimized for different operating points depending on the desired quantity of fuel and the rail pressure for the diagnosis or the adaptation as parameters. This means that for a predetermined quantity of fuel and a predetermined rail pressure the optimum injection time is determined. The injected amount of fuel has the advantage for example that it can be especially simply optimized by a corresponding matching of the injection time.

In an embodiment it is determined in the diagnosis whether a parameter lies in a setpoint range, with the parameter being matched in a matching cycle to the diagnosis if it lies outside the setpoint range. The parameter in this case is preferably approximated to a predetermined setpoint value in the setpoint range. This enables a first rough match to be undertaken. If the parameter reaches the setpoint value after the first adaptation cycle further adaptation of the parameter can also be dispensed with.

In another embodiment it is determined in the adaptation whether a parameter lies in a setpoint range. If it deviates from the setpoint value the parameter is approximated for a fine matching in such cases in one or more matching cycles as far as possible to the setpoint value. The adaptation in this case has the advantage that the parameter can be further optimized in relation to the diagnosis.

In accordance with another embodiment an error value is stored if the parameter after ending of the diagnosis or of the adaptation lies further outside the setpoint range. The error value in this case can typically be a scalar variable which is set in correlation to the deviation from the setpoint value and/or an error code which specifies that the emission-relevant control device is faulty. This has the advantage of enabling such an error value to be called up later and to be able to determine from it which of the emission-relevant control devices are faulty.

In a further embodiment an overall error value is formed from the error values of the emission-relevant control devices and compared with a predetermined threshold value, for example an emission limit value. If the overall error value exceeds the emission limit value for example a warning message can be output to the driver by illuminating a warning lamp so that the driver can visit a workshop in good time.

FIG. 1 first shows the diagram which shows a diagnosis or an initially rather "rough" adaptation of emission-relevant control devices being carried out at the start of a driving mode. In this case, in a driving mode having a length of typically one predetermined test cycle of $t_{Test}$=20 min, a diagnosis is carried out for the individual cylinders of a vehicle engine 1 to 8.

In addition to the diagnosis of all cylinders 1-8 however frequently no complete adaptation or fine matching of cylinders 1-8 can be undertaken since the driving mode, such as an overrun cut-off phase for example, is usually not sufficiently long enough for this. In the present case, as is shown in FIG. 1 for example, the test cycle time $t_{Test}$ is sufficient for example to undertake a first "rough" matching of all eight cylinders 1-8 of the vehicle engine. However the test cycle time $T_{Test}$ is no longer sufficient to also carry out an adaptation of the cylinders 1-8. In other words, in the present test cycle, although a diagnosis of all cylinders 1-8 could be undertaken, there would be no adaptation of the cylinders. With short driving cycles this leads to the adaptation not been carried out at all since total usable time in overrun cut-off phases is used to carrying out the diagnosis.

In the adaptation and diagnosis the emission-relevant control device, here the respective cylinder, is typically optimized in respect of its emission behavior.

To do this at least one parameter of an operating point is observed in the diagnosis which allows a direct and/or indirect conclusion to be drawn about a growth in emissions for example. An example of such a parameter of an operating point is the amount of fuel injected into the respective cylinder in a predetermined driving mode or operating state. As well as the fuel amount, other parameters can however also be taken into account which allow a direct or indirect conclusion to be drawn about an emission behavior. An example of carrying out a diagnosis is explained in greater detail below.

Normally the diagnosis carries out a first rougher matching of the emission-relevant control devices compared to adaptation if it is established that a parameter is deviating from a setpoint range or setpoint value. In the adaptation a fine matching of the emission-relevant control devices is once again undertaken, for example of the parameters previously matched in the diagnosis. Thus in the adaptation typically of least one parameter at a number or essentially all operating points of a respective cylinder is observed or optimized if this deviates from a setpoint range or setpoint value. Such a parameter is for example the injection time which is optimized to obtain a desired fuel injection amount. The fuel injection amount and the rail pressure are typically predetermined in such cases. As well as this parameter however further parameters or combinations of parameters can also be optimized at the respective operating points. For the rail pressure the activation values for the actuators which set the rail pressures will typically be adapted in such cases. Another example is the adaptation of the detection of the position of an air regulator flap, especially the measured values for a completely open or closed flap. The adaptation in this case normally lasts longer than the diagnosis. The reason for this is that the diagnosis is typically carried out for precisely a desired amount of fuel and a defined rail pressure. The adaptation on the other hand takes place for typically four amounts of fuel in each case and four different rail pressures (i.e. sixteen different operating points). In addition the adaptation is carried out for a longer period in order to obtain better statistics.

In order, by contrast with the prior art, to essentially guarantee that in a predetermined driving mode at least a part of a predetermined adaptation or diagnosis will be carried out, the various embodiments proceed as follows. In accordance with various embodiments the adaptation is first divided up into a number of sections, i.e. at least two or more sections for example. If a prespecified driving mode is now established in driving operation, such as an override cut-off phase for example, the various embodiments first begin with a first adaptation step adapt.1. As the first adaptation step adapt.1 an atomic adaptation step can typically be carried out at the start of the driving mode. The complete diagnosis of at least a few or all emission-relevant control devices is then carried out. If it is established here that the respective parameter of the emission-relevant control devices lies in a setpoint range or has reached a prespecified setpoint value, it can be established for example that the adaptation for this parameter with these emission-relevant control devices does not have to be continued further since it has already reached the setpoint value. Otherwise, subsequent to the diagnosis, the adaptation or further adaptation sections are typically activated for the rest of the driving mode.

In other words, if during the diagnosis for example a deviation of the emission-relevant control device from the setpoint value is established, the adaptation is reactivated subsequent to the diagnosis for a further adaptation section, for example after the complete execution of the diagnosis for a part or for all emission-relevant control devices or in a next predetermined driving mode. In this way it can be ensured that the necessary adaptation is carried out by the activation strategy of the diagnosis and the adaptation. The frequency of execution of the error detection or the detection of the deviation from the setpoint range or a setpoint value can be maximized by this. In the case of errors detected in the diagnosis these can be corrected in the adaptation. An activation of the adaptation is thus not required continuously.

In FIG. 1, instead of an established driving mode, a test cycle with a test cycle time $t_{Test}$=20 min is used and the principle according to various embodiments is explained using this. Basically predetermined driving modes are determined in normal driving operation in which an adaptation and the diagnosis will be carried out. In such cases the various embodiments is designed so that it can be guaranteed that at least part of the adaptation and diagnosis can be carried out if an established predetermined driving mode, such as an overrun cut-off phase for example, is not shorter than a predetermined test cycle time $t_{Test}$. In this case the test cycle time, as previously stated, is determined by statutory requirements for example or as a result of empirical values for how long a specific driving mode lasts on average.

For better understanding the various embodiments will be $t_{Test}$ explained below on the basis of a test cycle with a test cycle time $t_{Test}$=20 m, with the test cycle time $t_{Test}$ basically also able to include any other period of time, depending on function, purpose or statutory requirements.

The subdivision of the adaptation into different sections adapt.1, adapt.2, adapt.3 can occur in different ways. Thus a part of the cylinders 1-8 can be tested in the respective adaptation sections adapt.1, adapt.2, adapt.3, in which case a complete adaptation is executed for each of the cylinders.

As an alternative all cylinders 1-8 can also be tested, with the adaptation adapt.1 only executing a predetermined part of the adaptation steps for the cylinders 1-8 in a first adaptation section and in a second and third adaptation section adapt.2, adapt.3 the remaining adaptation steps for the cylinders 1-8, until all adaptation steps of the adaptation for all cylinders 1-8 have been run.

Basically however in the respective adaptation sections adapt.1, adapt.2, adapt.3 for example only a part of the cylinders 1-8 also only a part of the adaptation steps can ever be executed, until at the end of all adaptation sections adapt.1, adapt.2, adapt.3 all cylinders 1-8 have been subjected to a complete adaptation. Furthermore the adaptation sections adapt.1, adapt.2, adapt.3 can always be constructed in the same way or can be constructed differently, with for example the adaptation sections of the previous examples able to be combined with each other. The splitting of the adaptation into adaptation sections allows a plurality of variants in order to achieve an adaptation of all cylinders at the end. In this case the adaptation can be subdivided into any given number of adaptation sections.

Figure 2:
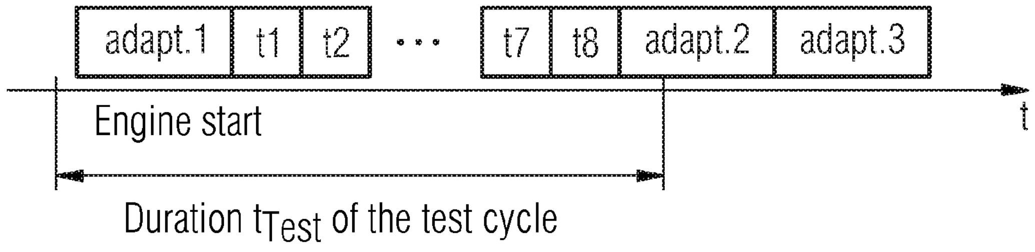

After the first adaptation section adapt.1 in the driving mode in FIG. 2 is completed, the diagnosis of at least a part or of all cylinders 1-8 is now undertaken. In this case it can be possible, as is shown in FIG. 2, that for example in the test cycle the test cycle time $T_{Test}$ is sufficient in order to subject all eight cylinders t1-t8 to a diagnosis. In the time still remaining following on from the diagnosis of the cylinders 1-8 the second adaptation section adapt.2 can be begun, when it is established for example that a parameter of a cylinder deviates from a setpoint value. This deviation can then for example be corrected by the adaptation sections adapt.2 and adapt.3.

The adaptation section adapt.2 can in the first test cycle however not be completely ended during the test cycle time $t_{Test}$ for example and is thus completed as soon as a predefined driving mode is established once again. Subsequently, as is shown in FIG. 2, the third adaptation section adapt.3 can be begun. The third adaptation section adapt.3 is then again followed by the continuation of the diagnosis of the cylinders 1-8 (not shown in FIG. 2). The adaptation is concluded if at the end all adaptation sections adapt.1, adapt.2, adapt.3 have been executed and thus all cylinders 1-8 have undergone an adaptation, if these have deviated from a setpoint range or a setpoint value in the diagnosis for example. Accordingly the diagnosis has also been carried out for all cylinders 1-8. Subsequently the adaptation and diagnosis is typically started once again.

If in such cases, as is shown in FIG. 2, all cylinders 1-8 will typically first be subjected to a complete diagnosis, whereas the adaptation could not yet be carried out completely for cylinders 1-8, then for example the diagnosis of the cylinders 1-8 can either be ended or simply continued from the start. This last-mentioned case will be explained in greater detail below with reference to FIG. 3.

In this way can be ensured that in each predetermined driving mode an at least part diagnosis and adaptation of cylinders 1-8 can be carried out. As a minimum duration of a driving mode in this case for example a driving mode duration of $t_{Test}$=20 min is required in accordance with NEDC New European Driving Cycle EURO 3, 4. The minimum duration $T_{Test}$ can however also be selected longer or shorter than 20 min, depending on the function, purpose or statutory requirement. Depending on the predetermined driving mode duration $t_{Test}$ the subdivision of the adaptation sections adapt.1, adapt.2, adapt.3 etc. of the adaption can then also be suitably selected in order to ensure that at least one adaptation section adapt.1 can be executed and at least one cylinder, a number of cylinders or all cylinders 1-8 can be subjected to a diagnosis.

Figure 3:
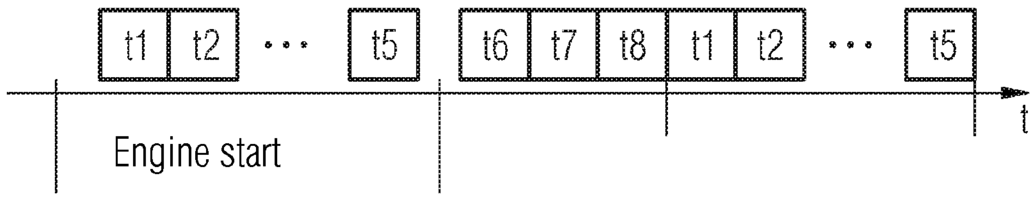

The case is now shown in FIG. 3 in which the diagnosis of all cylinders 1-8 is not yet completed during a driving mode. Carrying out the adaptation has been omitted from the diagram in this figure for reasons of clarity. In the present case, during the duration of a prespecified driving mode, for example an override cut-off phase, as well as the first adaptation section (not shown), a diagnosis or diagnosis cycles t1-t5 can be carried out for at least five cylinders 1-5. For the renewed establishing of the predetermined driving mode a second adaptation section (not shown) is carried out for example and furthermore a diagnosis or diagnosis cycles t6-t8 of the next three cylinders 6-8. This means that the diagnosis is actually completed for all cylinders 1-8 and could be ended at this point, whereas the adaptation will be continued until it is also finished for cylinders 1-8. In order to obtain a result for the adaptation and diagnosis which is as precise and up-to-date as possible it is desirable for example in such a case to continue adaptation of the cylinders, beginning for example with the cylinder 1. In this case for example during the time of the predetermined driving mode, as well as the cylinders 6-8 the cylinders 1-3 or, as is shown in FIG. 3 by way of example, the cylinders 1-5 can be adapted.

In this way in a predetermined driving mode and at least a part of the diagnosis and a part of the adaptation of emission-relevant control devices, such as the cylinders for example, can be achieved simultaneously and at the same time also a result of the diagnosis which is as up-to-date as possible.

A brief explanation will be given below of an example for carrying out the diagnosis for one cylinder for example, as can be carried out in various embodiments, with the invention however not being restricted to this form of diagnosis. It is evident to the average person skilled in the art that there are a plurality of possible variations for carrying out a diagnosis, especially also in respect of the type of emission-relevant control device which is subjected to a diagnosis and of which the parameters are to be optimized.

The diagnosis can be carried out as follows. In a diagnosis cycle t1 for a first cylinder for example initially an amount of fuel is injected into the first cylinder with a predetermined injection time, with an injection time which has been used in a previous cycle typically being used as the injection time. Then it is established or estimated in a first estimation whether the amount of fuel lies within a setpoint range or outside the setpoint range. If the amount of fuel deviates from the setpoint range or also from a setpoint value an adaptation cycle is started.

In this adaptation cycle the injection time is now adapted in accordance with the amount of fuel of the first estimation in order to achieve an improved or optimum fuel combustion. In such cases the injection time is adapted such that the amount of fuel where possible achieves a predetermined optimized setpoint value or this setpoint value will be approached. The amount of fuel is then estimated once again with the new injection time subsequent to the injection process. If the amount of fuel in this case lies within or is back within the setpoint range or tolerance range, an error value of zero is stored since in this case essentially no increase in emissions is being caused by this first cylinder. Furthermore a so-called DTC (Diagnostic Trouble Code) can additionally be stored which specifies that the first cylinder is error-free.

However if the amount of fuel again lies outside the set-point range and if the injection time cannot be adapted such that the optimum fuel combustion can be achieved since the injection time required for this for the estimated amount of fuel exceeds or falls below a maximum or minimum injection time for example, a value not equal to zero or greater than zero is set as the error value (scalar variable) since in this case an increase in emissions is occurring at the investigated first cylinder. The size of the error value can in this case typically be determined as a function of the size of the deviation from the setpoint value or the setpoint range. In addition a diagnostic trouble code DTC is stored indicating that the first cylinder is faulty.

The increase in emissions established for the first cylinder does not necessarily already have to be so large here that an emission value reaches or exceeds a critical value, for example the emission limit. The decisive factor is that the first cylinder contributes in its injection behavior to a growth in emissions, with a correction solely over an adaptation cycle with the aid of the injection time for example not being possible.

The error values of the individual cylinders 1-8 are added at the end to an overall error value. If for example this exceeds a predetermined threshold value, for example an emission limit value, an error message can be output to the driver for example. The trouble codes DTC for the individual cylinders can typically be retrieved in a workshop and which of the cylinders is faulty can be determined.

Such a diagnosis has the advantage that the cylinder can be subjected to a first "rough" adaptation, with, as previously described, an injection time being matched in an adaptation cycle. This can be carried out comparatively quickly. In the adaptation on the other hand for example different injection times for injection of fuel into the cylinder during the predetermined driving mode can be used and typically optimized in a number of matching cycles such that they reach a predetermined optimized setpoint value or this value is at least approached as far as possible. In addition not only one operating point but a plurality or all operating points of a respective cylinder can be optimized in the adaptation. In this context one or more parameters in the respective operating points are optimized during adaptation.

The overrun cut-off phase as a predetermined driving mode has the advantage in this case that the driver lifts off the gas in this case so that parameters such as the amount of fuel injected will not be influenced by the action of the pedal.

As well as parameters such as the injection time, further parameters can be observed and optimized in the adaptation, as in the diagnosis. Such parameters typically include deviations occurring in the fuel pressure sensors or FUP sensors, the exhaust gas feedback, the turbocharging, the exhaust gas post-treatment, the activation values for the actuators which set the rail pressures etc., just to give a few examples. Furthermore the absence of pre-injections or post-injections can also be used as parameters. Furthermore, in addition to an overrun cut-off phase as prespecified driving mode, other suitable driving modes or combinations of driving modes can be considered.

Furthermore the number of sequence of diagnosis and adaptation or the respective adaptation section can be varied in any given way in the predetermined driving mode. The number and sequence, as shown in FIG. 1-3, are merely given by way of example. The invention is not restricted to these.

What is claimed is:

1. A method for adapting operation of emission-relevant control devices of a vehicle in a predetermined driving mode, the method comprising the steps of:

Determining whether the vehicle has reached the predetermined driving mode having a shorter expected duration than a duration of a preferred test cycle;

If the vehicle has reached the predetermined driving mode, diagnosing at least one parameter associated with operation of at least one of the emission-relevant control devices;

comparing the at least one parameter to a setpoint range or a setpoint value; and if the at least one parameter deviates from the setpoint range or the setpoint value, carrying out at least a first section of an adaptation for the at least one emission-relevant control device, the first section of an adaptation including optimizing at least one of a plurality of operating points of the at least one of the emission-relevant control devices.

2. The method according to claim 1, further comprising the first section of the adaptation selected from a plurality of sections of the adaptation as a function of the predetermined driving mode, with the first section of the adaptation and a diagnosis for at least one emission-relevant control device executed within the expected duration of the predetermined driving mode.

3. The method according to claim 1, wherein, when the diagnosis is executed for all emission-relevant control devices, while the adaptation of the emission-relevant control devices is not yet completed, the diagnosis is either ended or is continued until the adaptation is completely executed.

4. The method according to claim 1, wherein the predetermined driving mode comprises an overrun cut-off phase.

5. The method according to claim 1, wherein the emission-relevant control devices comprise cylinders of a vehicle engine.

6. The method according to claim 1, wherein the at least one parameter comprises a duration of fuel injection into a cylinder of the vehicle.

7. The method according to claim 1, wherein, in an adaptation section at least one of the following is executed: all sections of the adaptation for a single emission-relevant control device and less than all sections of the adaptation for more than one emission-relevant control devices.

8. The method according to claim 1, further comprising storing an error value if the at least one parameter lies outside the setpoint range after completion of at least one of the diagnosing step and carrying out the at least a first section of the adaptation, wherein the error value includes at least one of a scalar variable which is set in correlation to the deviation from the setpoint value and an error code specifying that the emission-relevant control device is faulty.

9. The method according to claim 8, further comprising calculating an overall error value by summing the error values of the emission-relevant control devices and delivering an error message to an operator of the vehicle, if the overall error value exceeds a threshold value, wherein the threshold value includes an emission limit value.

10. A device for controlling the operation of emission-relevant control devices of a vehicle in a predetermined driving mode, comprising:

a driving mode determination device operable to determine whether the vehicle has reached the predetermined driving mode having a shorter expected duration than a duration of a preferred test cycle;

a diagnosis device diagnosing at least one of the emission-relevant control devices, if the driving mode determination device establishes that the vehicle has reached the predetermined driving mode, by determining at least one parameter of an operating point of at least one emission-relevant control device, and an adaptation device executing at least a first section of an adaptation for the at least one emission-relevant control device if the diagnosis device determines that the at least one parameter is outside of a setpoint range, the first section of the adaptation optimizing the at least one parameter of the operation point of the at least one emission-relevant control device.

11. The device according to claim 10, further comprising an error storage device storing an error value including a scalar variable if the parameter lies outside the setpoint range after ending of at least one of the diagnosis and the adaptation, further comprising at least one of: the error value set in correlation to the deviation from the setpoint value and an error code signifying that the emission-relevant control device is faulty if the parameter lies outside the setpoint range after ending of at least one of the diagnosis and the adaptation.

12. The device according to claim 10, wherein the first section of the adaptation is selected as a function of a predetermined driving mode, with a diagnosis for at least one emission-relevant control device executed within the predetermined test cycle.

13. The device according to claim 10, wherein, when the diagnosis is executed for all emission-relevant control devices, while the adaptation of the emission-relevant control devices is not yet completed, the diagnosis is either ended or is continued until the adaptation is completely executed.

14. The device according to claim 10, wherein the predetermined driving mode includes an overrun cut-off phase.

15. The device according to claim 10, wherein the emission-relevant control devices are the cylinders of a vehicle engine.

16. The device according to claim 10, wherein the at least one parameter includes an injection time of fuel into a cylinder.

17. The device according to claim 10, wherein, in an adaptation section at least one of the following is executed: all adaptation steps for an emission-relevant control device and a part of the adaptation steps for a number of the emission-relevant control devices.

18. The device according to claim 10, wherein in the diagnosis it is determined whether the parameter lies in a setpoint range, wherein the parameter being matched in an adaptation cycle if the parameter lies outside the setpoint range, further comprising the parameter approximated to a predetermined setpoint value in a setpoint range.

* * * * *